United States Patent [19]
Fukunaga et al.

[11] Patent Number: 5,274,555
[45] Date of Patent: Dec. 28, 1993

[54] CONTROLLING APPARATUS OF STEERING ANGLE OF REAR WHEELS OF FOUR-WHEEL STEERING VEHICLE

[75] Inventors: Takashi Fukunaga; Akiyoshi Segawa, both of Osaka, Japan

[73] Assignee: Matsushita Electric Industrial Co., Ltd., Osaka, Japan

[21] Appl. No.: 743,225

[22] Filed: Aug. 9, 1991

[30] Foreign Application Priority Data

| Aug. 10, 1990 | [JP] | Japan | 2-212861 |
| Dec. 28, 1990 | [JP] | Japan | 2-409044 |
| Apr. 2, 1991 | [JP] | Japan | 3-69708 |

[51] Int. Cl.$^5$ ............................................. B62D 5/04
[52] U.S. Cl. ............................ 364/424.05; 180/79.1; 180/140; 180/142; 280/91
[58] Field of Search ............ 364/424.05; 280/91; 180/79.1, 140-143

[56] References Cited

U.S. PATENT DOCUMENTS

| 4,730,839 | 3/1988 | Miyoshi | 280/91 |
| 4,767,588 | 8/1988 | Ito | 180/79.1 |
| 4,828,061 | 5/1989 | Kimbrough et al. | 180/79.1 |
| 4,834,205 | 5/1989 | Mizuno et al. | 180/79.1 |
| 4,878,557 | 11/1989 | Shibahata et al. | 180/142 |
| 4,947,327 | 8/1990 | Kawagoe | 180/141 |
| 4,961,144 | 10/1990 | Yabe et al. | 364/424.05 |
| 5,018,070 | 5/1991 | Eguchi | 180/79.1 |
| 5,076,381 | 12/1991 | Daido et al. | 180/79.1 |
| 5,097,918 | 3/1992 | Daido et al. | 364/424.05 |
| 5,145,022 | 9/1992 | Kido | 280/91 |
| 5,156,229 | 10/1992 | Yasui et al. | 180/79.1 |

FOREIGN PATENT DOCUMENTS

| 0233012 | 8/1987 | European Pat. Off. |
| 1237263 | 9/1989 | European Pat. Off. |
| 3911453 | 10/1989 | Fed. Rep. of Germany |
| 61-295175 | 12/1976 | Japan |
| 63-41282 | 2/1983 | Japan |
| 61-241274 | 10/1986 | Japan |
| 63-192667 | 8/1988 | Japan |
| 1-306370 | 12/1989 | Japan |
| 3-28083 | 2/1991 | Japan |
| 3054076 | 8/1991 | Japan |
| 8806546 | 9/1988 | PCT Int'l Appl. |
| 8911992 | 12/1989 | PCT Int'l Appl. |

OTHER PUBLICATIONS

Grundriss der praktischen Regelungstechnik, Samal, Munchen, 1980, pp. 292-307.

Primary Examiner—Gary Chin
Attorney, Agent, or Firm—Wenderoth, Lind & Ponack

[57] ABSTRACT

A steering angle of rear wheels of a four-wheel steering vehicle is controlled so that a quick response of an electric motor mounted in the rear wheels is achieved only when it is necessary, thereby avoiding wasteful consumption of power. In addition, a yaw rate feedback system is kept stable. When unstable vibration of the electric motor is detected, a gain to the yaw rate is adjusted.

4 Claims, 12 Drawing Sheets

1) $K_i = 64/16^4$, $K_p = 128/16^4$, $K_d = 12800/16^4$

2) $K_i = 4/2^{16}$, $K_p = 256/16^4$, $K_d = 25600/16^4$

CONTROLLING APPARATUS OF STEERING ANGLE OF REAR WHEELS OF FOUR-WHEEL STEERING VEHICLE

BACKGROUND OF THE INVENTION

1. Field of the Invention

The present invention relates to a controlling apparatus for controlling a steering angle of rear wheels of a four-wheel steering vehicle such as an automobile or the like by use of an electric motor in correspondence to the running state of the vehicle, i.e., a turning angle of a steering wheel, etc.

2. Description of the Prior Art

Vigorous research and development has been directed to a four-wheel steering system to steer the rear wheels of a vehicle corresponding to the vehicle running state, and some systems have actually been put to practical use.

In a four-wheel steering system now in practical use, for example, as disclosed in Japanese Patent Laid-Open Publication No. 1-22675 (22675/1989), when the vehicle is running at speeds lower than a predetermined vehicle velocity, a turning ratio between the front and rear wheels is set so that a steering angle of the rear wheels becomes the reverse phase to that of the front wheels. On the other hand, when the vehicle is running at higher speeds than the predetermined vehicle velocity, the turning ratio is set so that the steering angle of the rear wheels becomes the same phase as that of the front wheels. FIG. 12 is a concrete example of the turning ratio set in the prior art four-wheel steering system.

A main advantage of the four-wheel steering vehicle is to enforce the cornering force approximately at the same time for the front wheel tires and rear wheel tires. Therefore, the four-wheel steering vehicle is allowed to move in a transverse direction faster than a front-wheel steering vehicle when the operator turns a steering wheel. In other words, if the front and rear wheels are turned in the reverse phase at low speeds and in the same phase at high speeds with an appropriate turning ratio, the vehicle starts turning at an earlier stage, thereby reducing a delay in transverse acceleration after turning of the steering wheel. This realizes, as effects in practical use, a capability of a small turn at low speeds and a capability of an emergency avoidance at high speeds, etc.

As a method to determine a steering angle of the rear wheels, the assignee of the present invention has proposed in Japanese Patent Application No. 2-212861 (212861/1990) to provide detecting means of a yaw rate (angular velocity of rotation around the center of gravity of a vehicle), so that the steering angle of the rear wheels is determined in accordance with the vehicle velocity, steering angle of the front wheels and yaw rate, and a displacement in an advancing direction of the vehicle due to external disturbances such as transverse winds or bad roads, etc. is corrected by turning the rear wheels by the determined steering angle.

However, the characteristic and response of an electric motor are varied with time in the prior art four-wheel steering apparatus of the aforementioned structure, whereby the stability of the rear wheels is undesirably endangered.

If the rotation of the electric motor is unstable, with resultant vibrations (therefore hindering the electric motor from stopping at a fixed position), the rear wheels become unsteady in their movement, resulting in an increase of power consumption in the electric motor.

Considering the yaw rate, if a signal of the yaw rate sensor is to be used for feedback, such delays as a time delay before the yaw rate is generated to the vehicle body after the rear wheels are turned, a response delay of the rear wheels, a time delay of the yaw rate sensor, a time delay for A/D conversion, a phase delay in a low pass filter to reduce noises of the yaw rate sensor, etc. make the movement of the rear wheels unstable, e.g., during the change of a lane at high speeds, thus deteriorating the steering stability.

Furthermore, a response speed to a desired steering angle of the rear wheels, which angle is determined by the angle of the steering wheel, yaw rate and vehicle velocity, namely, a response speed of the electric motor mounted in the rear wheels is set always constant in the prior art four-wheel steering apparatus, and aimed for a high speed region requiring a quick response. Therefore, the response speed is kept high even in a region not requiring a quick response, for example, even when the rear wheels remain unturned. As a result, the electric motor consumes unnecessary power.

SUMMARY OF THE INVENTION

An essential object of the present invention is to provide a controlling apparatus for controlling a steering angle of rear wheels of a four-wheel steering vehicle, which realizes smooth and comfortable running of the vehicle without unstable operation of an electric motor resulting from the unevenness and change with time or vibrations of the characteristic of the electric motor.

A further object of the present invention is to provide a controlling apparatus for controlling a steering angle of rear wheels of a four-wheel steering vehicle, whereby a desired steering angle of the rear wheels is obtained stably and a displacement in an advancing direction of the vehicle due to external disturbances such as transverse winds or bad roads, etc. is stably corrected, and which is further characterized in that the steering angle of the rear wheels is properly controlled even when the unstable movement of the rear wheels is detected.

A still further object of the present invention is to provide a controlling apparatus for controlling a steering angle of rear wheels of a four-wheel steering vehicle, designed to change a response speed of an electric motor for a desired steering angle of the rear wheels thereby suppressing power consumption in the electric motor.

In accomplishing the above-described objects, according to the present invention, a controlling apparatus for controlling a steering angle of rear wheels of a four-wheel steering vehicle is provided with at least one of an angle sensor of a steering wheel, a vehicle speed sensor and a yaw rate sensor, so that the rear wheels are steered directly by an electric motor via a reduction gear in correspondence to the running state of the vehicle detected by the sensor. The controlling apparatus includes a position detector for detecting the position of the electric motor, a first interface circuit for detecting the current position of the electric motor from the position detector, an operating unit for operating a desired steering angle or the like of the rear wheels from an input value of each sensor, and a second interface circuit for impressing a current instructing value to a motor driver from the operating unit. In the controlling apparatus, a desired position of the electric motor is changed step by step by intermittently connecting the electric motor with the rear wheels, and the response waveform of the electric motor at this time is calculated by the operating unit from the current position of the electric motor detected by the position detector. Then, a deviation between the desired position and current position of the electric motor is operated in the operating unit, and a weighting constant is determined for proportional, integral and differential operations. The obtained results of operations are added and output as a current instructing value to the motor driver via the second interface circuit.

Moreover, the operation of the deviation between the desired position and current position of the electric motor is repeated and the weighting constant is changed until the response waveform of the electric motor when the desired position is changed step by step is comprehended within a desired response.

In the case where the deviation between the desired position and current position of the electric motor repeats positive and negative values for a predetermined number of times or more within a preset term, and, if an absolute value of the deviation during the term is not smaller than a fixed value, it is determined that the electric motor is vibrating and zero is output as a current instructing value to the motor driver.

The above-discussed constitution enables constant response of the controlling apparatus without influences of the variation and change with time of the characteristic of the electric motor. If the deviation between the desired position and current position of the electric motor repeats positive and negative values with a fast cycle, in other words, when the electric motor is judged to be vibrating, zero is output as a current instructing value to the motor driver, thereby stopping the vibration and unstable movement of the rear wheels.

In a further aspect of the present invention, a controlling apparatus for controlling a steering angle of rear wheels of a four-wheel steering vehicle is provided with an angle sensor of a steering wheel, a vehicle speed sensor, a rear wheel steering angle sensor for detecting a steering angle of rear wheels and a yaw rate sensor, wherein the rear wheels are directly steered by an electric motor via a reduction gear in correspondence to the running state of the vehicle detected by the above sensors. The controlling apparatus includes a controlling device which outputs a rear wheel steering angle instructing signal in response to the sensor signals of the above sensors and a rear wheel steering device which steers the rear wheels based on the rear wheel steering angle instructing signal from the controlling device, so that a response time before a yaw rate is generated to the vehicle body after the rear wheels are turned by use of the sensor signals, and the size of the yaw rate are predicted within the controlling device, and a signal of the yaw rate sensor is corrected by using the predicting value to be an actual yaw rate.

In the case where a deviation between a desired steering angle and the current steering angle of the rear wheels operated within the controlling device repeats positive and negative values for a predetermined number of times or more within a preset term, and, if an absolute value of the deviation is not smaller than a fixed value in the term, the rear wheels are judged to be vibrating, and a gain to the detecting value of the yaw rate sensor is reduced so that the absolute value becomes the fixed value or lower.

The controlling apparatus further features a plurality of yaw rate sensors to detect the yaw rate of the vehicle.

In the above-described constitution, a delay of the yaw rate sensor is corrected through prediction of the response time and size of the yaw rate. Therefore, when the rear wheels are detected to be unstable, a gain of a yaw rate feedback loop is reduced to stabilize the feedback loop. In other words, when the absolute value of the deviation exceeds the fixed value, the rear wheels are judged to be vibrating and a gain to an average value of the detecting values of the yaw rate sensors is reduced so that the absolute value becomes the fixed value or lower. Moreover, the rear wheels are steered in accordance with a value obtained by adding an average value of the detecting values of the plurality of yaw rate sensors and an average value of the differential values for every sampling cycle.

In a still further aspect of a controlling apparatus of the present invention, a position detector is installed in an electric motor. A controlling device of the controlling apparatus is provided with a first interface circuit for detecting the current position of the electric motor from the position detector, an operating unit for operating a desired steering angle of the rear wheels from input values of an angle sensor of a steering wheel, a yaw rate sensor and a vehicle speed sensor, and a second interface circuit for impressing a current instructing value to a motor driver from the operating unit.

According to one way of approach to the above-described objects by the controlling apparatus of the present invention, a deviation between the desired position and current position of the electric motor is operated within the operating unit. Then, a value obtained through differential operation of the current position of the electric motor is subtracted from a value obtained by multiplying an adding value of a value through proportional operation of the deviation and a value through integral operation of the deviation with a value proportional to the size of the vehicle velocity, which is output as a current instructing value to the motor driver via the second interface circuit.

In another way of approach made by the controlling apparatus, a deviation between the desired position and current position of the electric motor is operated within the operating unit. Then, a value obtained through differential operation of the current position of the electric motor is subtracted from a value obtained by multiplying an adding value of a value through proportional operation of the deviation and a value through integral operation of the deviation with a proportionating constant which is made different between for the same phase time and for the reverse phase time, and then output as a current instructing value to the motor driver via the second interface circuit.

In the above-described constitution, a response speed of the electric motor, namely, rear wheels is raised as the vehicle velocity is increased. Therefore, power consumption during the low speed running time not requiring a quick response of the rear wheels is reduced.

Furthermore, a response speed of the electric motor is made different to the steering wheel angle sensor from that to the yaw rate sensor and the speed in steering the rear wheels in the reverse phase is decreased to the steering wheel angle sensor, thereby reducing power consumption and ensuring smooth generation of the yaw rate. Since the response of the electric motor to the yaw rate sensor in steering the rear wheels in the same phase is maintained high, a feedback loop of a steering system of the rear wheels is stabilized. Errors in an advancing direction or course of the vehicle due to the external disturbances can be corrected stably by steering the rear wheels.

These and other objects and features of the present invention will become apparent from the following detailed description taken in conjunction with preferred embodiments thereof with reference to the accompanying drawings.

DETAILED DESCRIPTION OF THE PREFERRED EMBODIMENTS

Figure 1:
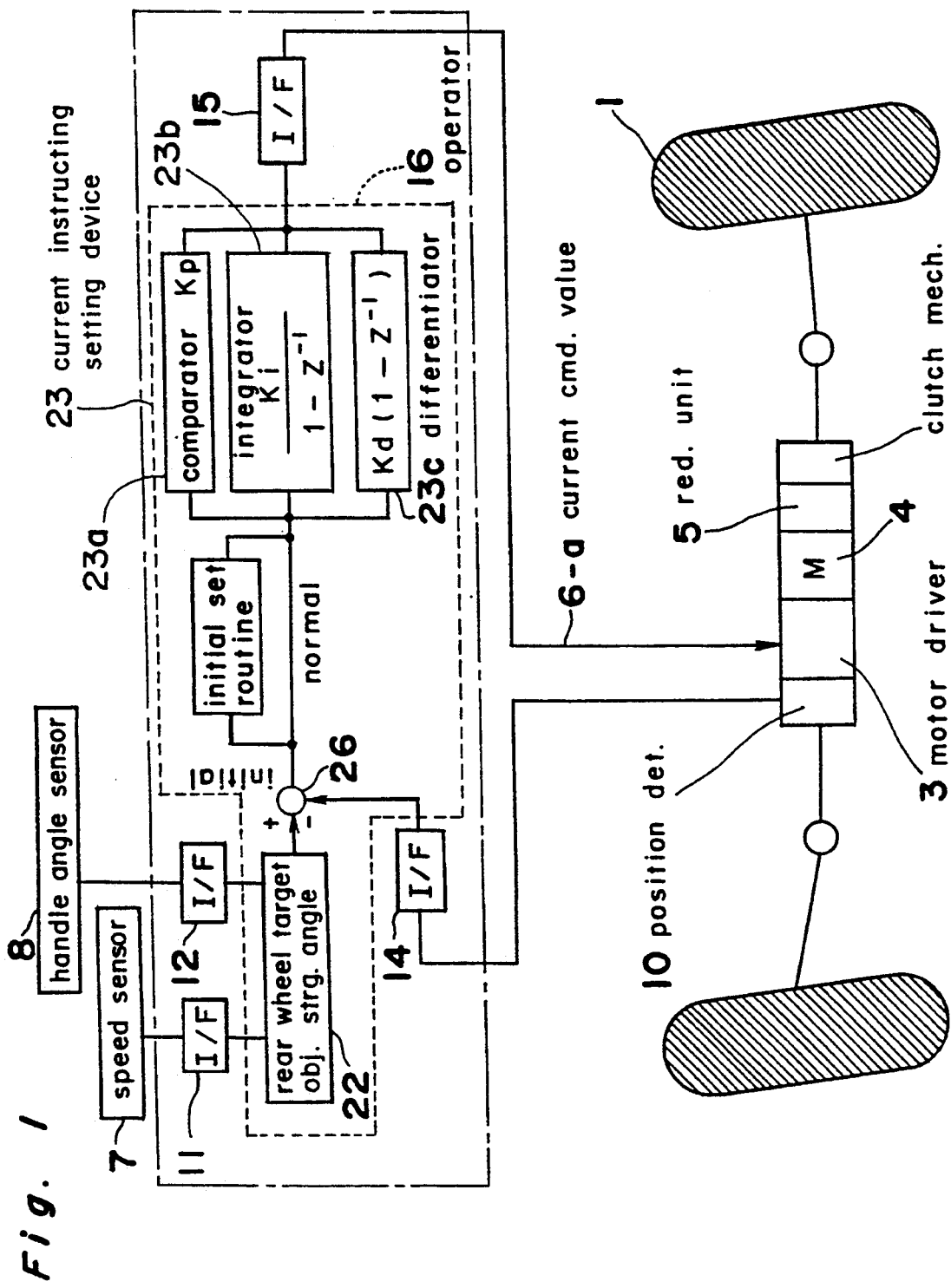
FIG. 1 is a block diagram of a controlling apparatus for controlling a steering angle of rear wheels of a four-wheel steering vehicle according to a first embodiment of the present invention.

Before the description of the present invention proceeds, it is to be noted here that like parts are designated by like reference numerals throughout the accompanying drawings.

First Embodiment

Referring to a block diagram of FIG. 1 showing a controlling apparatus in a first embodiment of the present invention, right and left rear wheels 1 are turned by an electric motor 4 according to a rear wheel steering angle instructing signal 6-a output to a motor driver 3 from a controlling device 2 which controls a steering angle of rear wheels of a four-wheel steering vehicle. A reduction gear 5 is present between the electric motor 4 and rear wheels 1 to amplify a torque. The controlling device 2 is constituted by an operating device 16 which determines a target steering angle of rear wheels according to an input value from each of a speed sensor 7, a steering wheel angle sensor 8 and a rear wheel position detector 10 and, also determines the above-referred rear wheel steering angle instructing signal 6-a and, interface circuits 11, 12, 14, 15 of the respective sensors. The operating device 16 is comprised of a desired steering angle setting device 22 for setting a desired steering angle of the rear wheels, a comparator 26 and a current instructing value setting device 23 which consists of a comparator 23a and couplers 23b, 23c. Values of the above sensors, i.e., speed sensor 7, steering wheel angle sensor 8 and rear wheel position detector 10 are input into the operating device 16 via the interface circuits 11, 12, 14.

Figure 2:
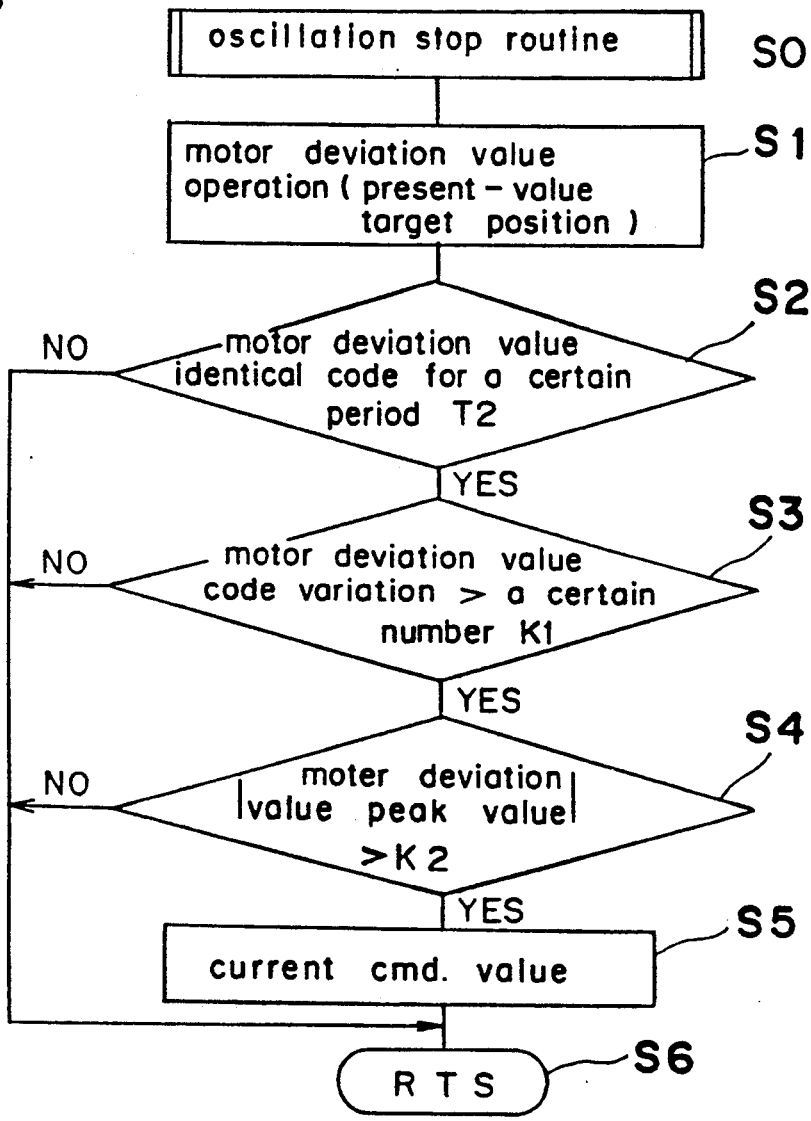
FIG. 2 is a flow chart of the operation of the controlling apparatus of FIG. 1.

FIG. 2 is a flow chart of the controlling apparatus of FIG. 1.

A sub routine shown in the flow chart of FIG. 2 is a "vibration preventing routine" processed for every sampling cycle T. A deviation of the electric motor is operated in step S1 first. If it is found in step S2 that the deviation continues for a predetermined time (T2) or more with the same symbol, the electric motor is judged not to have vibrations, and the flow returns to a main routine S6.

In the event the vibration with the same symbol does not continue for a predetermined time in step S2, the change of the symbol of the deviation is monitored in step S3. If the symbol of the deviation is changed for a predetermined number of times K1 or more, the flow goes to step S4. In the other cases, the flow returns to the main routine S6. A peak value of the deviation is checked in step S4, and if an absolute value of the peak value is larger than K2, the electric motor is judged to be vibrating. The flow then moves to step S5. If the absolute value of the peak value is smaller than K2, the flow returns to the main routine S6. A current instructing value for the motor driver is changed to 0 in step S5. Kp, Kd, Ki are determined by an initializing routine when an ignition switch is turned ON (initialized).

Figure 3:
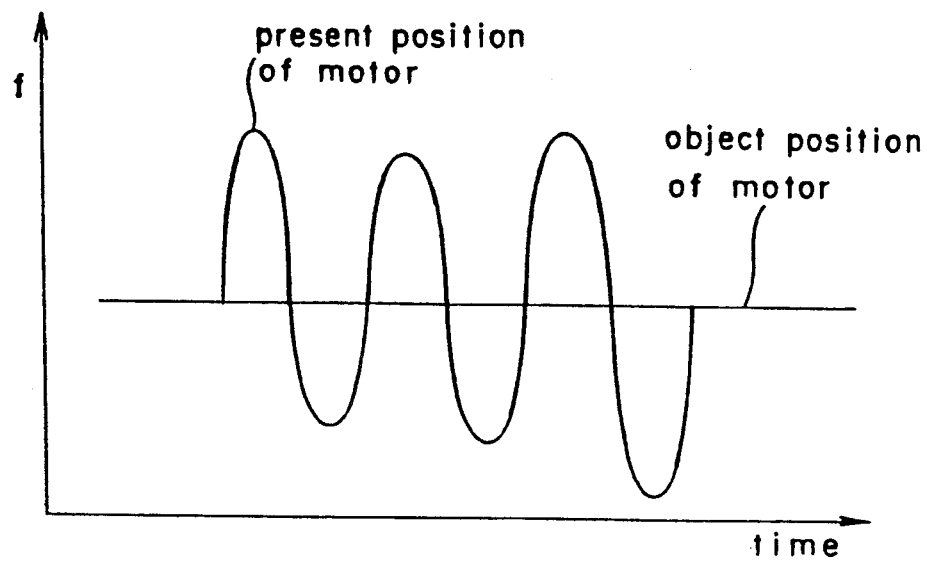
FIG. 3 is a graph explanatory of the vibration of an electric motor.

FIG. 3 is a graph diagrammatically representing the vibrating phenomenon of the electric motor. When it continues that the current position of the motor is not focused to a desired position, the motor is judged to be vibrating, when the supply of electric current to the motor driver is cut.

According to the first embodiment as described hereinabove, vibrations are removed when the electric motor is in the state approximately agreeing with a desired value, so that power consumption by the electric motor is reduced.

A modification of the above first embodiment will be discussed hereinbelow.

Figure 4:
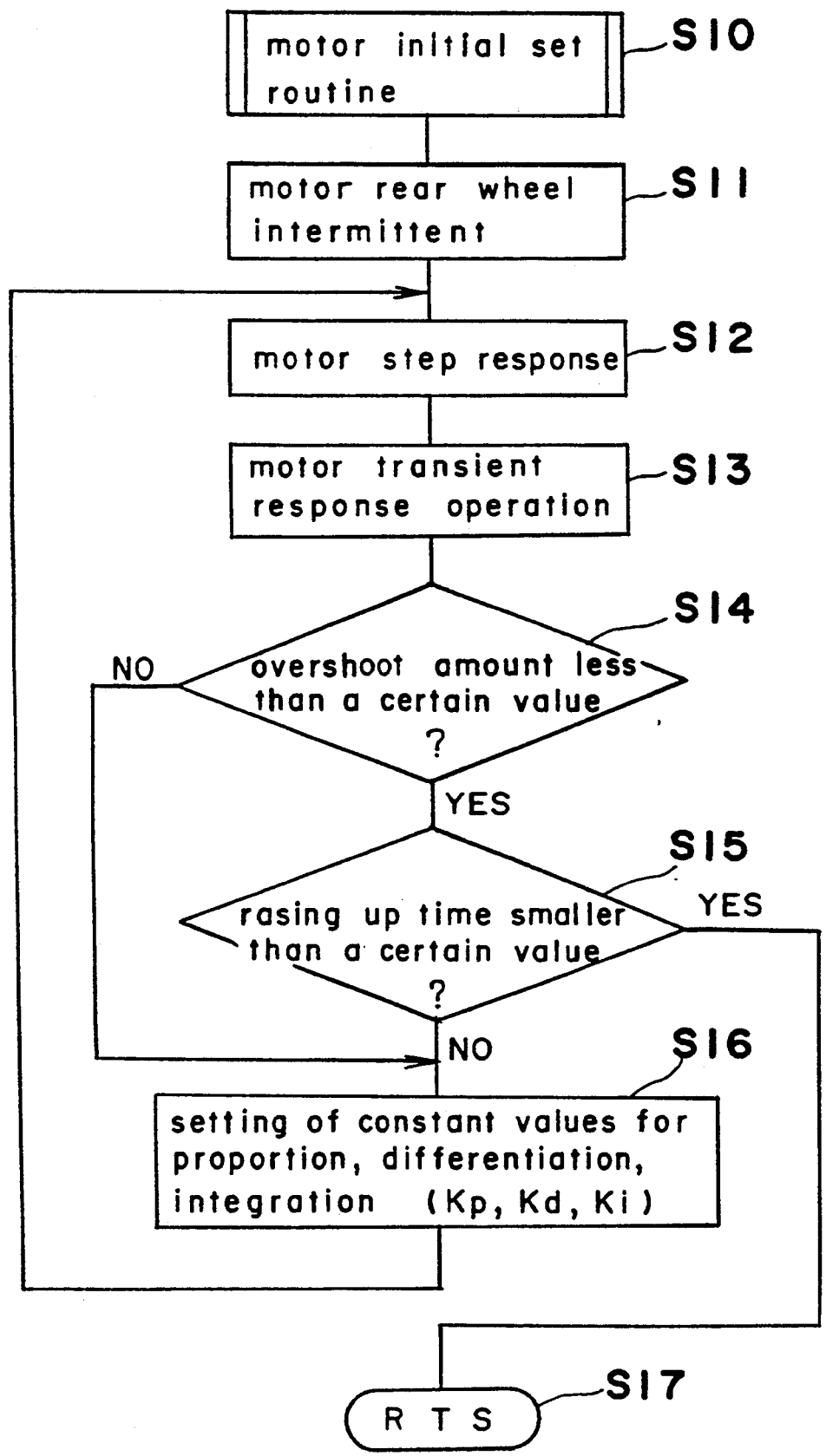
FIG. 4 is a flow chart of the operation of a controlling apparatus according to a modified embodiment of FIG. 1.

In FIG. 4, "an initializing routine of the electric motor" is started immediately after an ignition switch is turned ON. The electric motor and rear wheels are intermittently connected with each other in step S11, that is, the motion of the electric motor is arranged not to be transmitted to the rear wheels. In the succeeding step S12, the electric motor is driven step by step. The current position of the electric motor is obtained in step S13 from the position detector 10 and corresponding interface circuit 14. If an overshoot of the electric motor is not smaller than a predetermined value in step S14, each constant for the proportional operation, differential operation and integral operation is set in step S16 so as to make the overshoot smaller. Then, the flow returns to step S12 to drive the electric motor step by step.

Meanwhile, if the overshoot of the electric motor is not larger than a predetermined value in step S14, it is checked in step S15 whether a rise time of the electric motor is equal to or lower than a predetermined value. If the rise time is not smaller than a predetermined value, a constant for each of the proportional, differential and integral operations is set in step S16 so that the rise time is reduced. Thereafter, the flow returns again to step S12.

To respond step by step is repeated until each of an overshoot and a rise time is turned not larger than a perdetermined value.

Figure 4A:
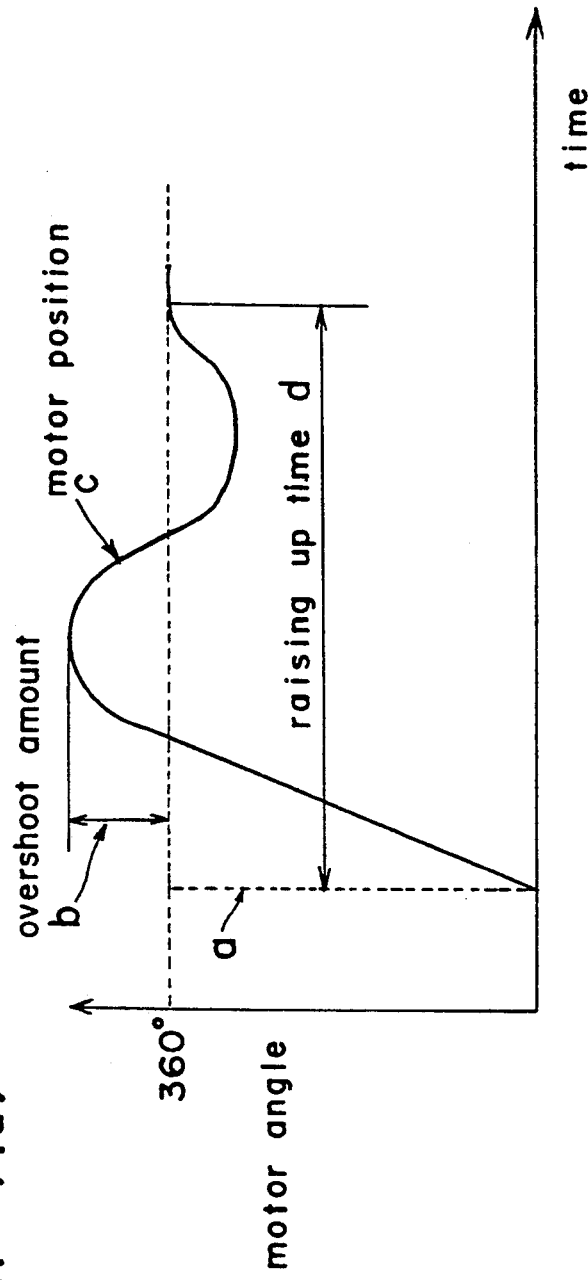
FIG. 4(a) is a graph showing a motor response to the step input of FIG. 4.
Figure 4B:
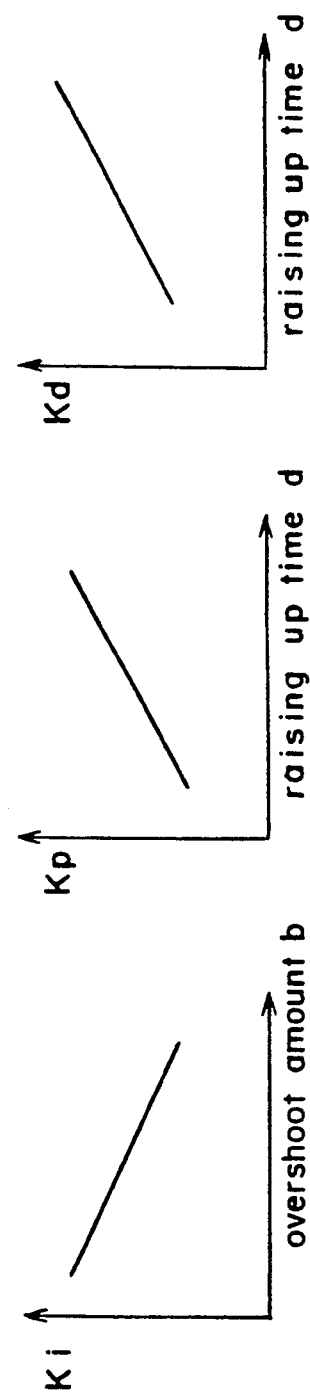
FIG. 4(b) shows constants to the overshoot and rise time of FIG. 4.
Figure 4C:
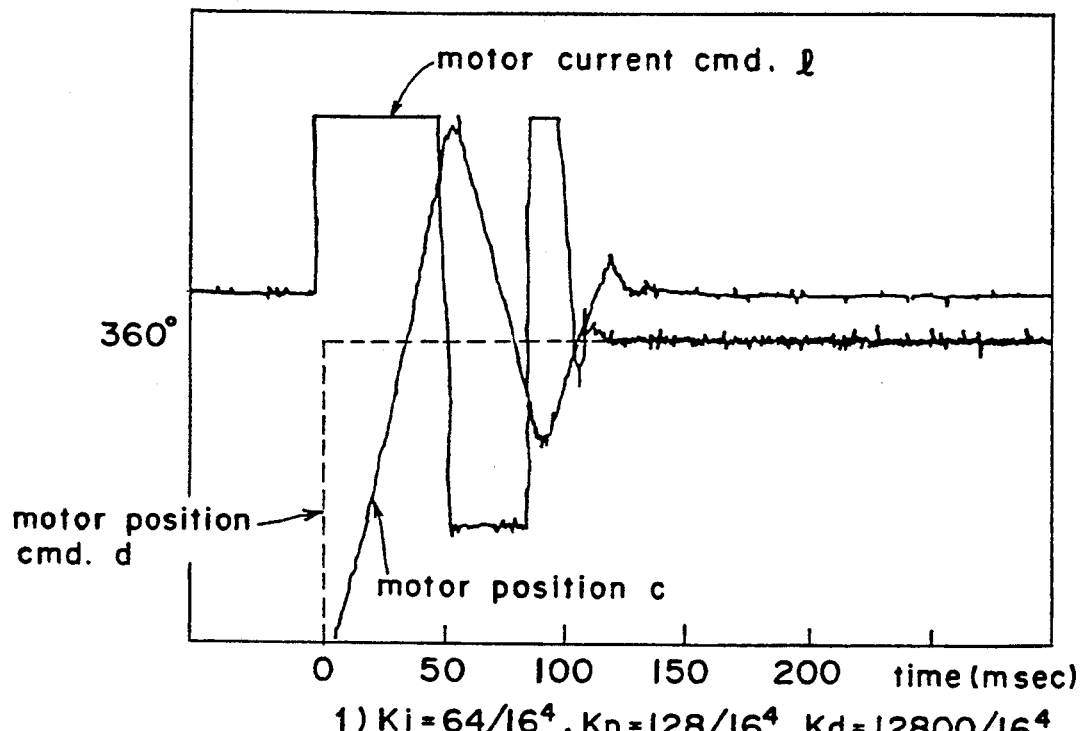
FIGS. 4(c) and 4(d) are graphs each showing one example of the step response of FIG. 4.
Figure 4D:
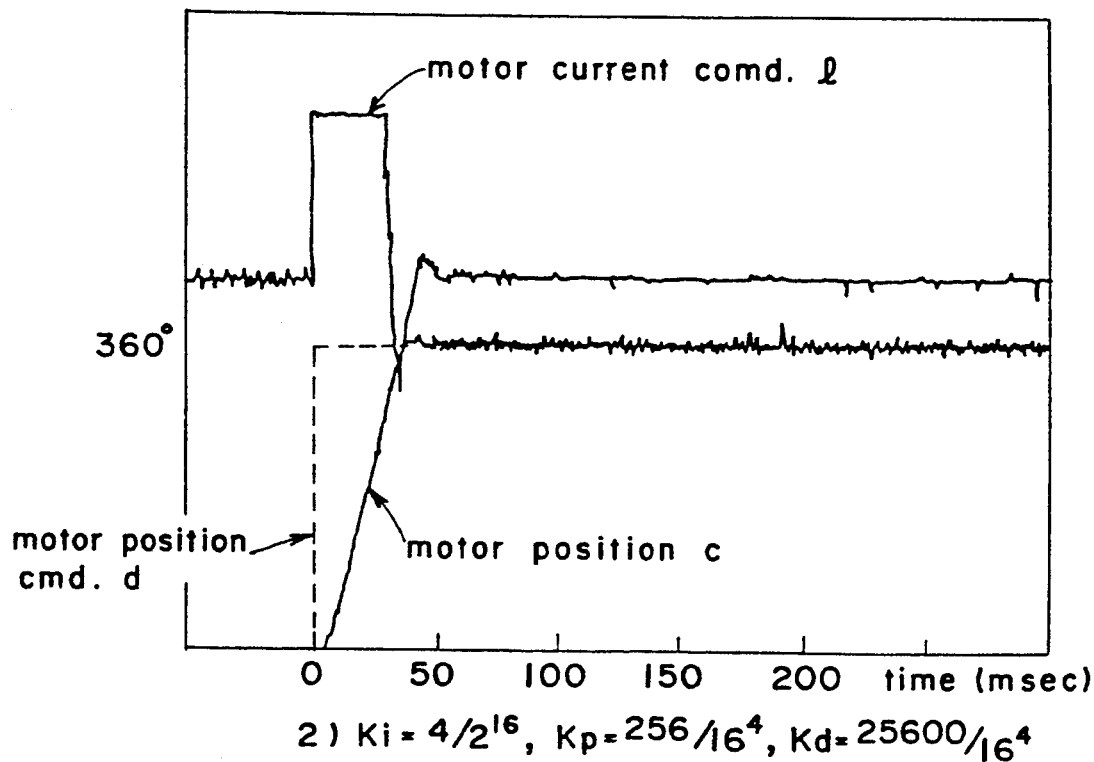

FIG. 4(a) is a graph showing a motor response including a motor position c relating to the motor angle and time in response to the step input. In FIG. 4(a) there is shown a position demand a, overshoot amount b for the motor angle, and a raising-up time d for the target time. FIG. 4(b) is a graph showing the change in each constant according to overshoot and rise time, wherein Ki is decreased when the overshoot is large, while Kp, Ki are increased when the rise time is large. However, actual initial value of Ki is $64/16^4$ (reduced every $2/16^4$), actual initial value of Kp is $128/16^4$ (increased every $4/16^4$), and actual initial value of Kd is $12800/16^4$ (increased every $256/16^4$). FIGS. 4(c) and 4(d) are graphs each showing one sample of the step response including the motor position c, motor position command d, and motor current command l in the event of having a target of overshoot amount being within 50 deg and raising-up time being 50 msec.

The above sequence is repeated to determine the constant for the proportional, differential and integral operations so that the electric motor shows a suitable transient response.

Although the foregoing modification is related to the initializing routine in general use to determine the constant for the proportional, differential and integral operations, the present invention is applicable to determining of a weighting constant for adaptive control or the like.

In the manner as above, the unstable movement of the rear wheels and electric motor resulting from the variation or unevenness of the characteristic and response or vibrations of the electric motor can be solved, and the power consumption of the electric motor is effectively reduced.

Second Embodiment

Figure 5:
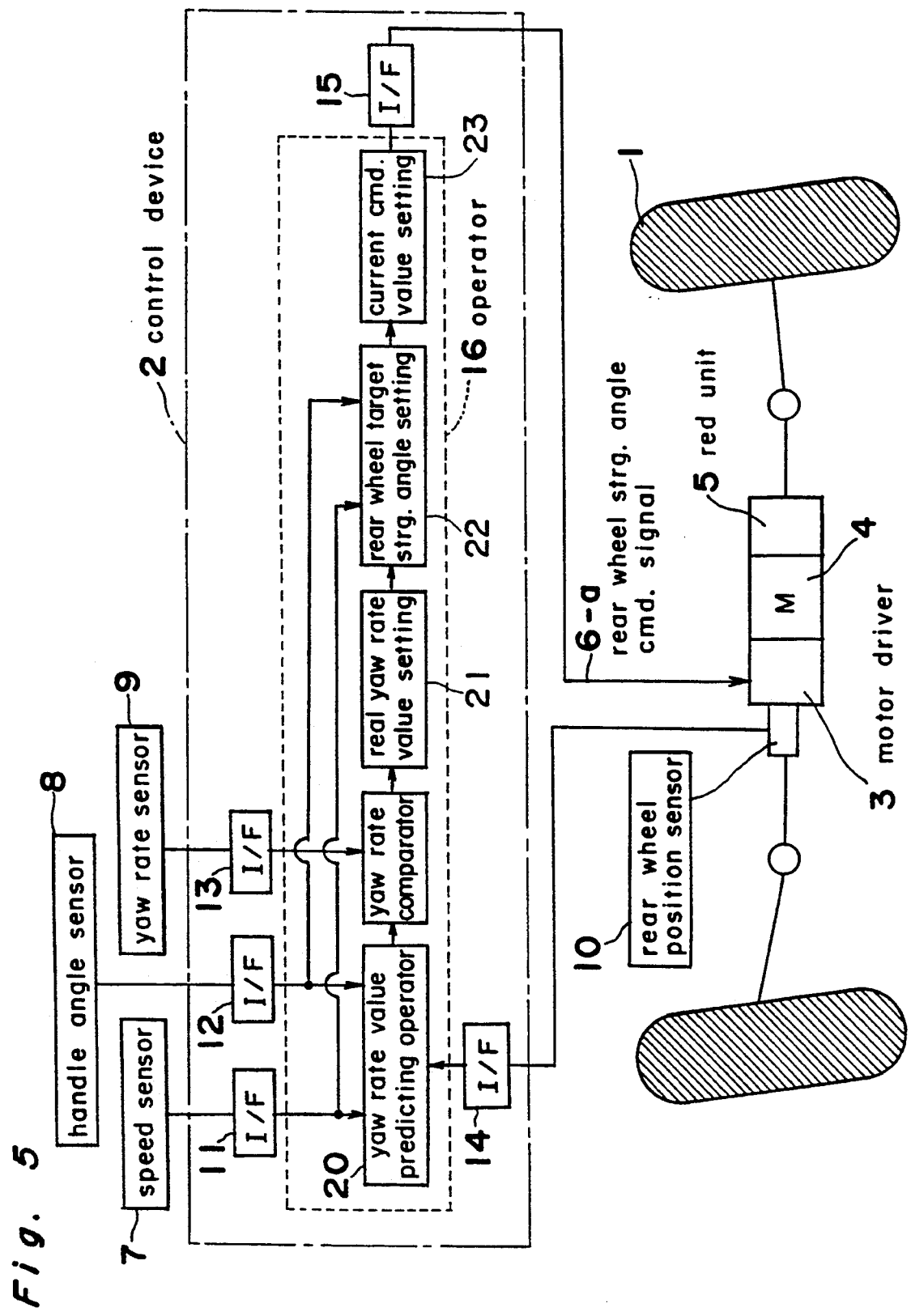
FIG. 5 is a block diagram of a controlling apparatus for controlling a steering angle of rear wheels of a four-wheel steering vehicle according to a second embodiment of the present invention.

FIG. 5 is a block diagram of a controlling apparatus for controlling a steering angle of rear wheels of a four-wheel steering vehicle according to a second embodiment of the present invention. In the controlling apparatus of FIG. 5, the right and left rear wheels 1 are turned by the electric motor 4 according to the rear wheel steering angle instructing signal 6-a output from the controlling device 2 to the motor driver 3. The reduction gear 5 between the electric motor 4 and rear wheels 1 is provided so as to amplify a torque. The controlling device 2 is constituted by the operating device 16 which determines a desired steering angle of the rear wheels according to input values of the speed sensor 7, steering wheel angle sensor 8 and rear wheel position detector 10, and interface circuits 11-15 for the corresponding sensors. The operating device 16 is comprised of a yaw rate predicting/operating device 20, an actual yaw rate setting device 21, the desired steering angle setting device 22 and the current instructing value setting device 23.

A predicting value of the yaw rate and a detecting value of the yaw rate detected by the yaw rate sensor are compared in the yaw rate comparator.

As a result of the comparison in the yaw rate comaratator, the detecting value $K1^*$ ($K1>1$) is set as an actual yaw rate value in the actual yaw rate setting device if the predicting value is larger.

Figure 6:
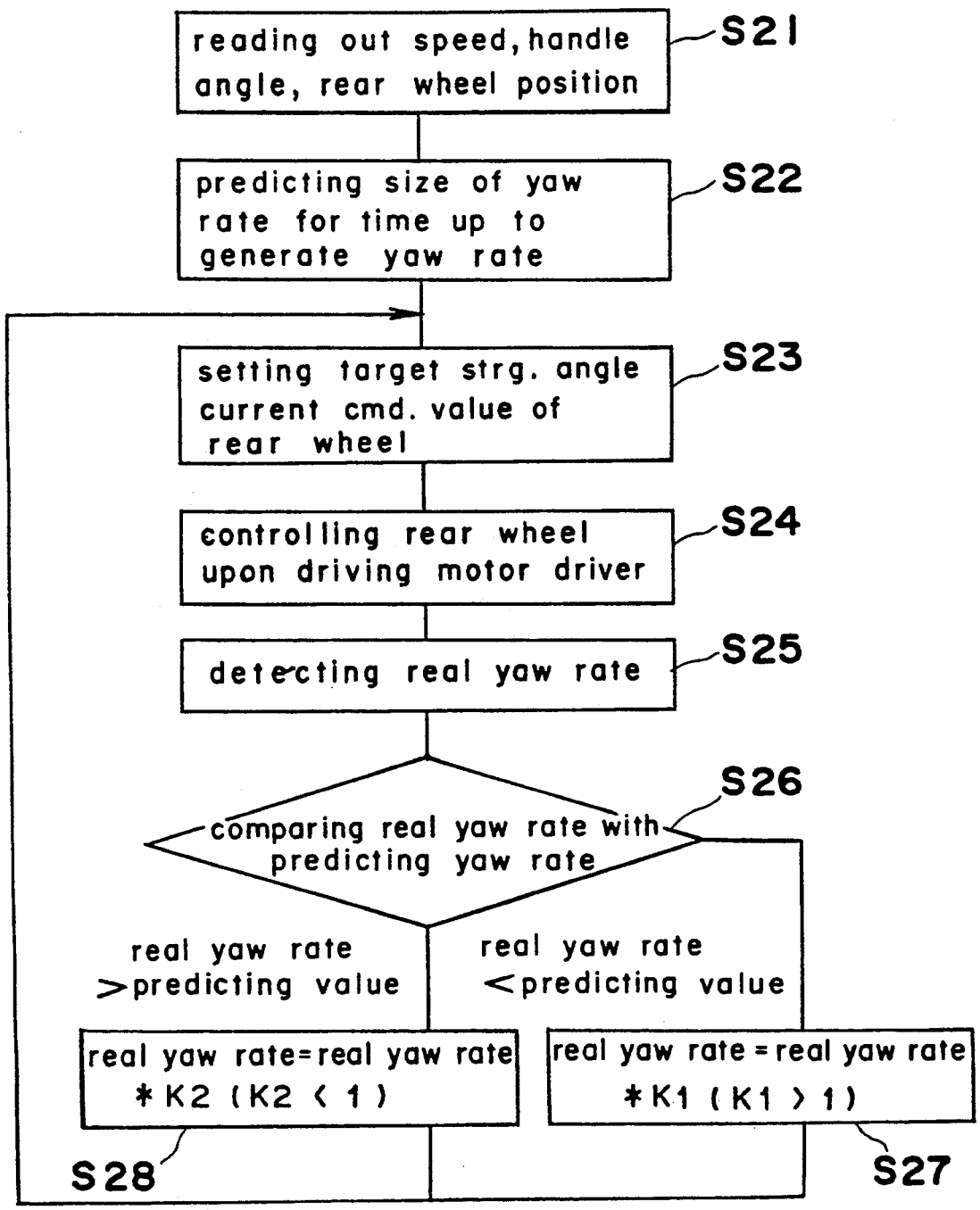
FIG. 6 is a flow chart of the operation of the controlling apparatus of FIG. 5.

The detecting value K2 ($k2<1$) is set as an actual yaw rate value if the detecting value is larger. Actual value of $K1=1.1$ Actual value of $K2=0.9$ The operation of the controlling apparatus in the above-described structure will be explained with reference to a flow chart of FIG. 6.

Values of the speed sensor 7, steering wheel angle sensor 8 and rear wheel position detector 10 are input to the operating device 16 via the interface circuits 11-14 (S21). A time before a yaw rate of the vehicle body is generated after the rear wheels are turned and, the size of the yaw rate are predicted in the yaw rate predicting/operating device 20 from the output values of the sensors (S22). Then, a desired steering angle of the rear wheels and a current instructing value are set by the desired steering angle setting device 22 from the predicted yaw rate, vehicle velocity and steering wheel angle (S23). At this time, the actual yaw rate setting device 21 is not driven at all without outputs from the yaw rate sensor 9, but transmits the output from the predicting/operating device 20 as it is to the desired steering angle setting device 22. The rear wheel steering angle instructing signal 6-a is output from the current instructing value setting device 23 to the motor driver 3 through the interface circuit 15 (S24). Subsequently, a yaw rate generated in the vehicle body after the rear wheels are turned is detected by the yaw rate sensor 9 via the interface circuit 13 (S25). The actual yaw rate detected in step S25 and the predicted yaw rate obtained in step S22 are compared with each other (S26). If the predicted yaw rate is found larger than the actual yaw rate, the actual yaw rate $*K1$ ($K1>1$) is corrected to an actual yaw rate value (S27). On the other hand, if the actual yaw rate is larger than the predicting value, the actual yaw rate $*K2$ ($K2<1$) is corrected to an actual yaw rate value (S28). These values K1, K2 are constants determined by the responding capability of the yaw rate sensor 9.

The procedure in steps S26-S28 is conducted by the actual yaw rate value setting device 21.

Back in step S23, a desired steering angle of the rear wheels and a current instructing value are set from the actual yaw rate value, vehicle velocity and steering wheel angle, which are output as the rear wheel steering angle instructing signal 6-a through the interface circuit 15 to the motor driver 3 in a similar manner as in step S24 described earlier. Subsequently, the above process is repeated until the rotary movement of the vehicle is finished.

According to the second embodiment of the present invention, information of the yaw rate is used in addition to the vehicle velocity and steering wheel angle so as to determine the desired steering angle of the rear wheels. Moreover, a time delay in outputting the yaw rate is predicted beforehand by the yaw rate predicting/operating device 20. Therefore, it becomes possible to suppress the unstable movement of the rear wheels during running at high speeds.

A modified embodiment of the controlling apparatus of FIG. 5 will now be described below.

Figure 7:
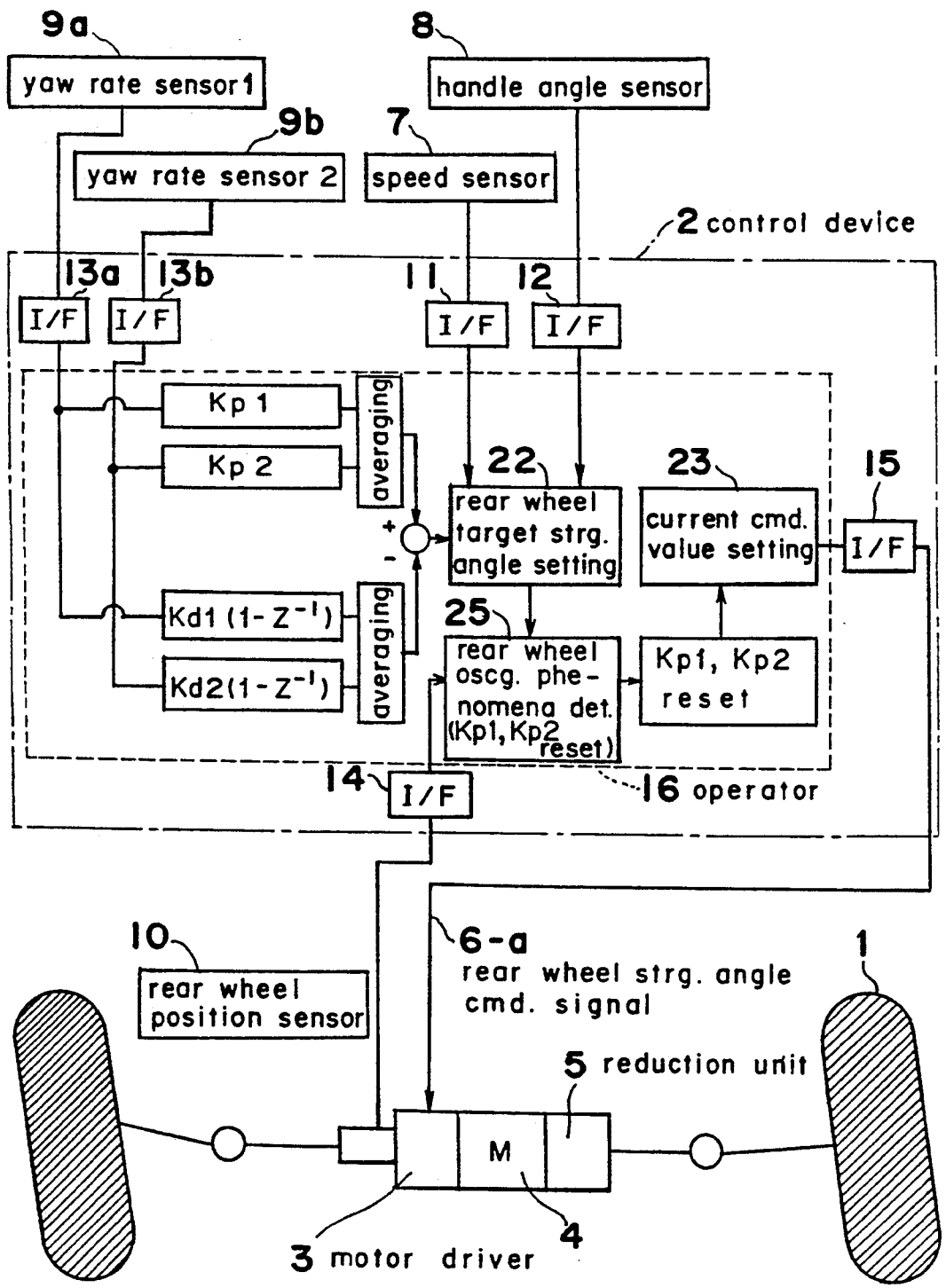
FIG. 7 is a block diagram of a controlling apparatus according to a modified embodiment of FIG. 5.

FIG. 7 is a block diagram of a modified controlling apparatus. Although the fundamental structure is the same as that of the second embodiment, this modification employs two yaw rate sensors.

The operation of the modified controlling apparatus will be depicted hereinafter.

Signals from a first and a second yaw rate sensors 9a, 9b are input to the operating device 16 through respective interface circuits 13a, 13b. Thereafter, each detecting value of the yaw rate sensors is multiplied with a constant Kp1, Kp2 and averaged. Moreover, a difference between each detecting value and a detecting value one cycle before is multiplied with a constant Kd1, Kd2 and averaged. The obtained averaged values are added to be an actual yaw rate value. The constants Kp1, Kp2, Kd1, Kd2 are determined by the inertia of the vehicle or the like in order to keep a yaw rate feedback loop stable. Then, a desired steering angle of the rear wheels and a current instructing value are set from the actual yaw rate value, vehicle velocity and steering wheel angle, similar to the second embodiment, and output as the rear wheel steering angle instructing signal 6-a to the motor driver 3 via the interface circuit 15. If the vibration of the rear wheels as a result of the instability of the yaw rate feedback loop is detected in the operating device 16, the constants Kp1, Kp2 are reset and a fresh current instructing value is set. At the next sampling time, an actual yaw rate value is set with use of these reset constants.

When a vibration is detected, a current instructing value is set after Kp1-ΔKp1 and Kp2-ΔKp2 are reset to Kp1 and Kp2, respectively. A yaw rate value is set by using the reset constants at the next sampling time.

Actual initial value of $Kp1 = 256/16^2 \ (=1)$ (reduced every $2/16^2$)

Actual initial value of $Kp2 = 256/16^2 \ (=1)$ (reduced every $2/16^2$)

Figure 8:
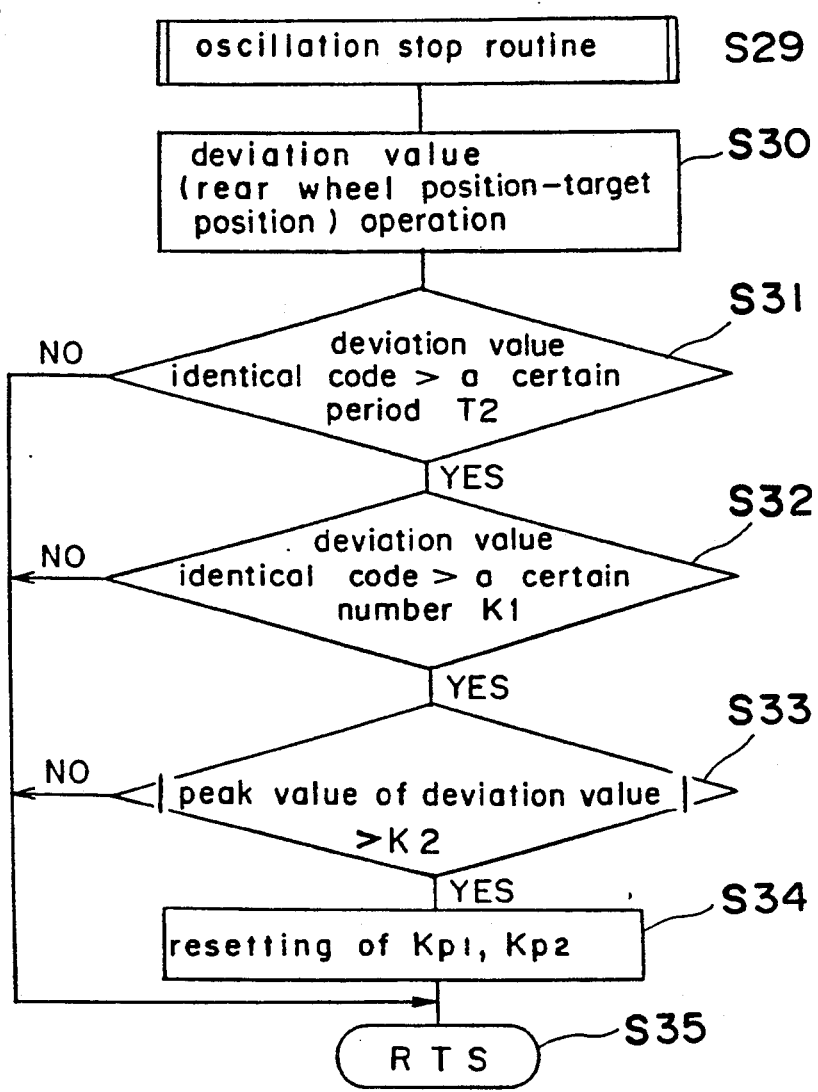
FIG. 8 is a flow chart of the operation of a controlling apparatus according to a further modified embodiment of FIG. 5.

FIG. 8 is a flow chart of an algorithm used to detect the vibration and to reset the constants in the modified embodiment of FIG. 7. A sub routine called a "vibration preventing routine" is processed for every sampling cycle. A deviation between the position of the rear wheels and a desired steering angle thereof is operated in step S30. If it is found in step S31 that the deviation continues for a predetermined time (T2) or more with the same symbol, the flow returns to a main routine S35.

In the event the vibration with the same symbol does not continue for a predetermined time in step S31, the change of the symbol of the deviation is monitored in step S32. If the symbol of the deviation is changed for a predetermined number of times K1 or more, the flow goes to step S33. In the other cases, the flow returns to the main routine S35. A peak value of the deviation is checked in step S33, and if an absolute value of the peak value is larger than K2, the rear wheels are judged to be vibrating. The flow then moves to step S34. If the absolute value of the peak value is smaller than K2, the flow returns to the main routine S35. In step S34, gain constants Kp1, Kp2 are reset to the detecting values of the yaw rate sensors to stabilize the yaw rate feedback loop.

Figure 9:
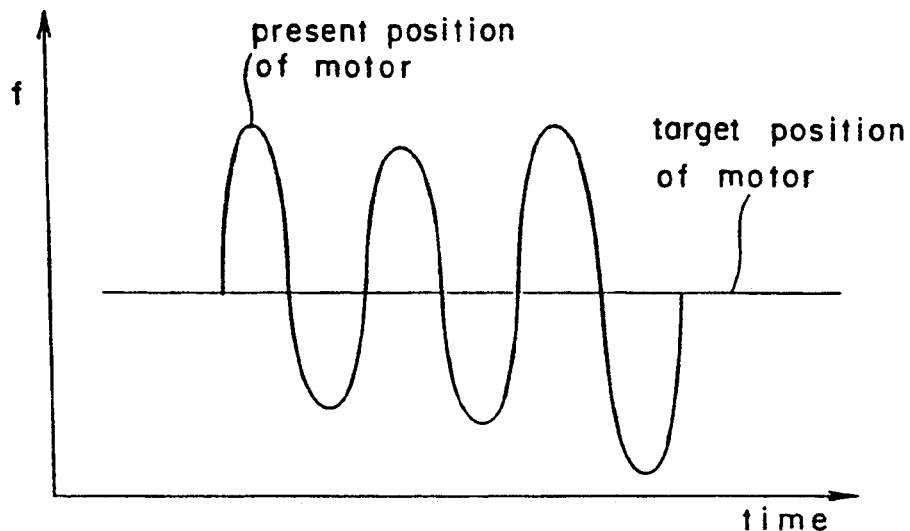
FIG. 9 is a graph explanatory of the vibration of rear wheels.

FIG. 9 is a graph diagrammatically representing the vibrating phenomenon of the rear wheels. When it continues that the current position of the rear wheels is not focused to a desired position, the rear wheels are judged to be vibrating.

As described hereinabove, in the modified embodiment, the rear wheels are turned according to the value obtained by adding the average value of the detecting values of the two yaw rate sensors and the average value of the differential values for every sampling cycle, thus eliminating errors proper to the sensors. In the case where the rear wheels are detected to be vibrating from the outputs of the position detector and the feedback system starts vibrating, the input gains Kp1, Kp2 of the feedback system are reset to settle the vibration. Therefore, the unstable movement of the rear wheels or waste of power due to the vibration of the rear wheels can be reduced. Although two yaw rate sensors are used in the modified embodiment, three, four or more yaw rate sensors may be employed. Increasing the number of the yaw rate sensors makes it possible to further reduce errors proper to the sensors.

It is so arranged in the second embodiment of the present invention that the yaw rate of the vehicle is fed back to steer the rear wheels, namely, to correct the moving direction of the vehicle, without a time lag between outputs of the yaw rate sensor and the other sensors. Accordingly, the rear wheels can be turned stably. Even if an unstable movement of the rear wheels is detected, a spin or the like danger can be avoided by adjusting the gain of the yaw rate.

Third Embodiment

Figure 10:
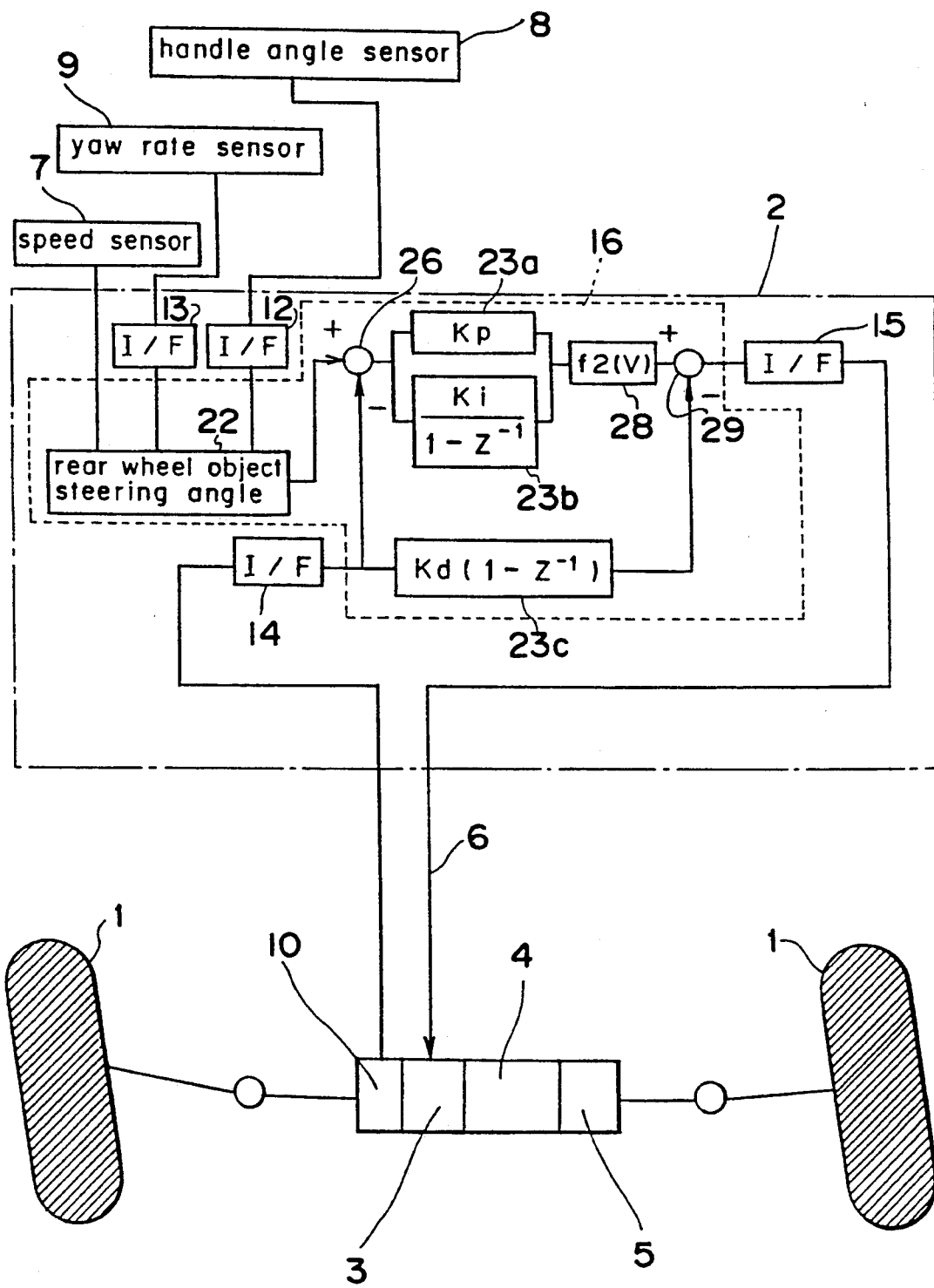
FIG. 10 is a block diagram of a controlling apparatus for controlling a steering angle of rear wheels of a four-wheel steering vehicle according to a third embodiment of the present invention.

FIG. 10 is a block diagram of a controlling apparatus for controlling a steering angle of rear wheels of a four-wheel steering vehicle according to a third embodiment of the present invention. As indicated in FIG. 10, the right and left rear wheels 1 are driven directly by the motor driver 3 and electric motor 4. Within the controlling device 2 are provided the first interface circuit 14 mounted to the electric motor 4 which converts a value of the position detector 10 to a digital value to thereby obtain the current position of the electric motor 4, steering wheel angle sensor 8, interface circuits 12, 13 for converting a detecting signal of the yaw rate sensor 9 to a digital value, second interface circuit 15 which feeds a current instructing value 6 to the motor driver 3 and operating device 16 which operates a desired steering angle of the rear wheels, the current instructing value 6 and detects a cycle of the speed sensor 7.

An algorithm within the operating device 16 will be discussed now. A deviation between a target steering angle of the rear wheels determined by the steering wheel angle, yaw rate and vehicle velocity, i.e., a target steering angle of the electric motor 4 mounted in the rear wheels 1 and, the current position of the electric motor 4 is operated for every sampling cycle. The deviation is integrated for every sampling cycle.

In the first place, a value obtained by multiplying the deviation with Kp is added to a value obtained by multiplying an integrating value of the deviation with a coefficient Ki. Then, a value obtained by multiplying a velocity of the electric motor 4 obtained through reduction of the current position and a current position one cycle before with Kd is subtracted from a value obtained by multiplying the above adding value with a function f(V) of the vehicle velocity, which is output as the current instructing value 6 to the motor driver 3 via the second interface circuit 15. The function f(V) is a constant proportional to the vehicle velocity. In other words, as the vehicle velocity is increased while the deviation is the same, the current instructing value 6 to the motor driver 3 is increased, thereby enhancing the controlling property of the electric motor 4.

Figure 10A:
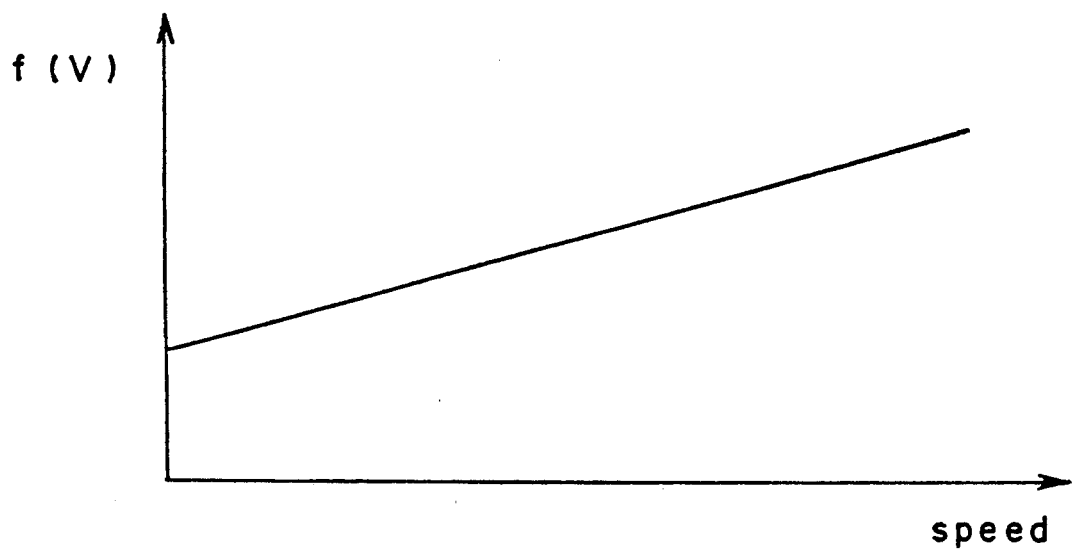
FIG. 10(a) is a graph showing the relation between speed and f(V) of FIG. 10.
Figure 12:
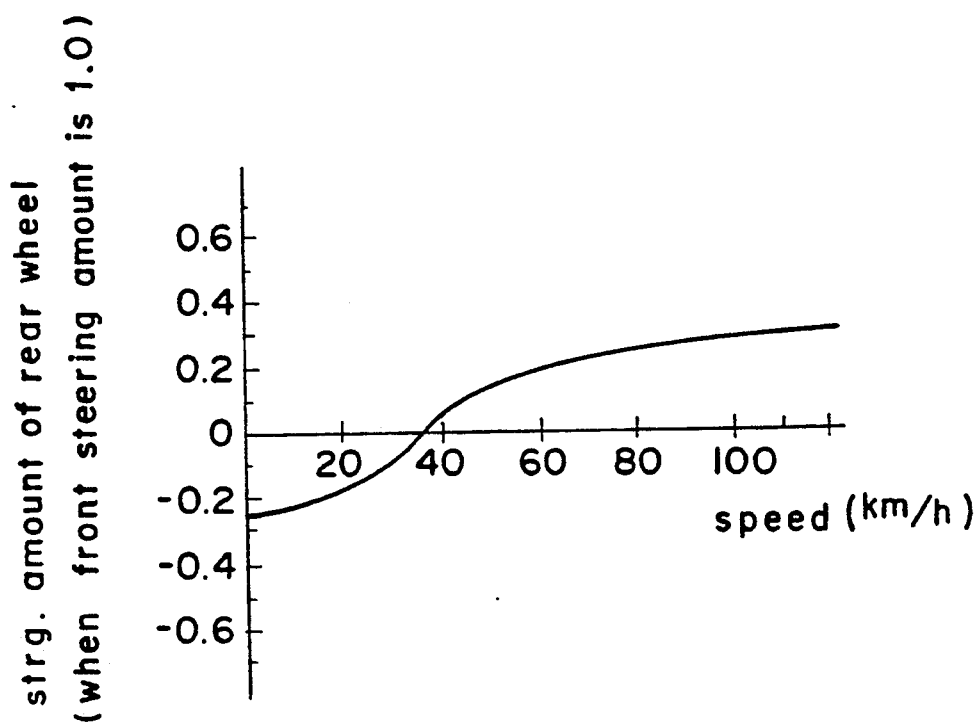
FIG. 12 is a graph of the ratio of steering angles between the front and rear wheels in a conventional four-wheel steering vehicle.

FIG. 10(a) is a graph showing the relation between vehicle velocity and function f(V), wherein f(V) is increased in proportion to the vehicle velocity.

Figure 11:
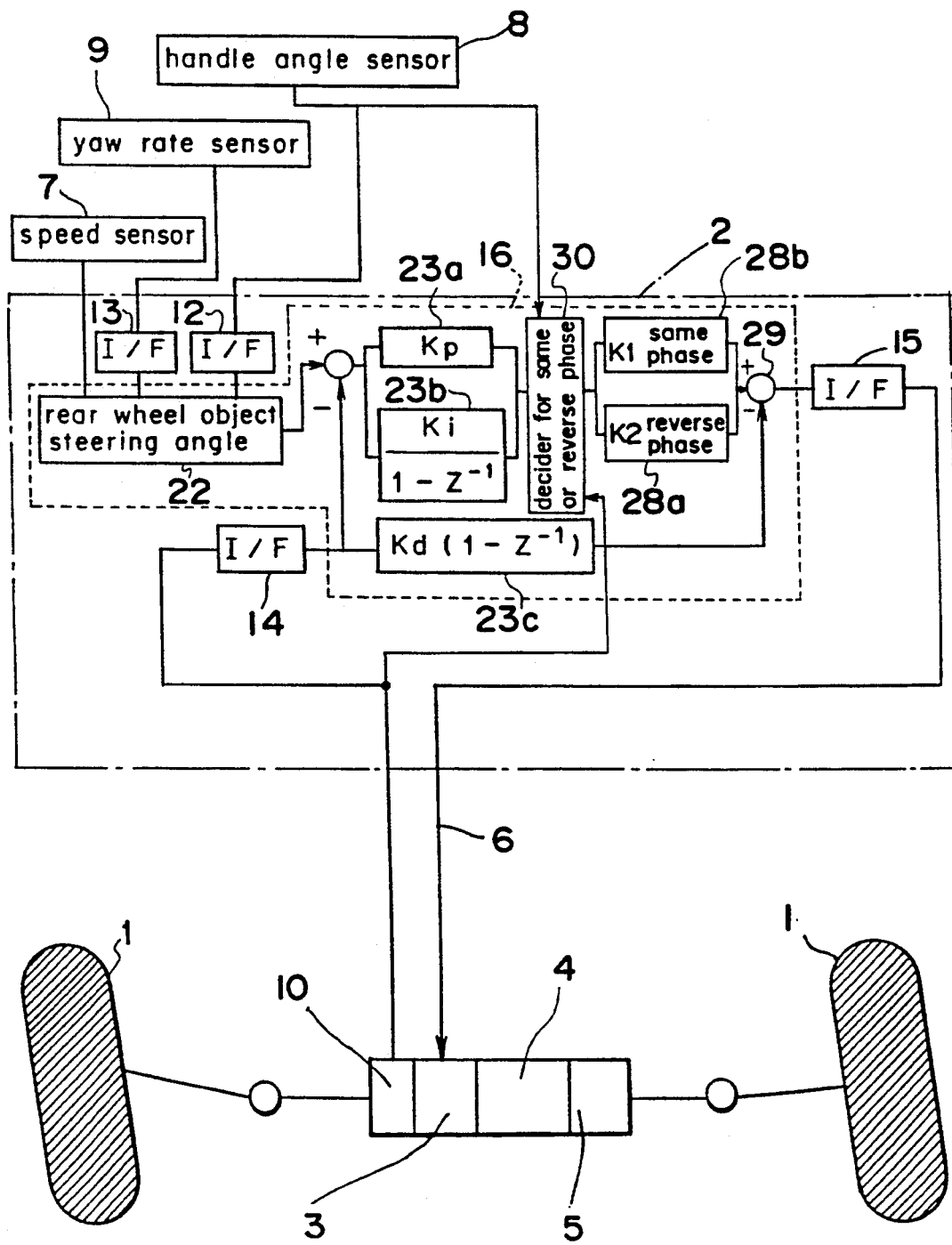
FIG. 11 is a block diagram of a controlling apparatus according to a modified embodiment of FIG. 10.

FIG. 11 is a block diagram of a controlling apparatus according to a modification of the third embodiment. The modified controlling apparatus is fundamentally equal to the apparatus of FIG. 10 in its structure, but is provided with a K1 (same phase) and a K2 (reverse phase) circuits in the f(V) circuit within the operating device 16.

Whether the rear wheels are turned in the same phase or reverse phase to the front wheels is detected by a phase detector from a steering wheel angle and a motor (rear wheel) angle. A gain K1 or K2 is multiplied for the same phase time or for the reverse phase time.

An algorithm within the operating device 16 will be depicted hereinbelow. A deviation between a target steering angle of the rear wheels determined by the steering wheel angle, yaw rate and vehicle velocity, i.e., a target steering angle of the electric motor 4 mounted in the rear wheels 1 and the current position of the electric motor 4 is operated for every sampling cycle. The deviation is integrated for every sampling cycle.

A value obtained by multiplying the deviation with Kp is added to a value obtained by multiplying an integrating value with the coefficient Ki. Thereafter, in the case where the front (not shown) and rear wheels are turned in the same phase, a value obtained by multiplying the velocity of the electric motor obtained through reduction of the current position and a current position one cycle before of the electric motor with Kd is subtracted from a value obtained by multiplying the adding value with K1. On the other hand, if the front and rear wheels are turned in the reverse phase, the value is subtracted from a value obtained by multiplying the adding value with K2. The resultant value is output as the current instructing value 6 to the motor driver 3 via the second interface circuit 15.

K1 is set larger than K2. That is, when the rear wheels are turned in the reverse phase to the front wheels in proportion to the size of the steering wheel angle, the electric motor gets delayed in response. If the rear wheels are turned in the same phase as the front wheels in proportion to the size of the yaw rate, the responding capability of the rear wheels is improved.

Although the above embodiment effects control according to a proportional integrating method, the fundamental concept of the third embodiment is made effective in the other controlling methods as well even when the responding capability of the electric motor is changed depending on the vehicle velocity or when the rear wheels are turned in the reverse or same phase to the front wheels.

In the above third embodiment, since the current instructing value fed to the motor driver is made smaller at a low speed region not requiring a quick response of the rear wheels, the responding speed of the electric motor is decreased to suppress the power consumption. Moreover, since the responding capability of the rear wheels is changed between when the rear wheels are turned in the reverse phase to the front wheels in proportion to the steering wheel angle and when the rear wheels are turned in the same phase as the front wheels in proportion to the yaw rate, the feedback loop for the rear wheel steering system to feed back the yaw rate is retained stable, whereby the advancing direction or course of the rear wheels can be corrected stably.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A controlling apparatus for controlling a steering angle of rear wheels of a four-wheel steering vehicle by driving an electric motor coupled to said rear wheels via a reduction gear, said controlling apparatus comprising:

at least one of a steering wheel angle sensor for detecting a steering wheel angle of a steering wheel of said vehicle, a vehicle speed sensor for detecting a speed of said vehicle and a yaw rate sensor for detecting an angular velocity of rotation about a center of gravity of said vehicle;

a position detector for detecting an operational position of said electric motor;

a first interface circuit for generating a current position signal indicative of said operational position of said electric motor detected by said position detector;

an operation unit for determining a desired operational position of said electric motor based on inputs received from said at least one sensor, for determining a deviation between the desired operational position of said electric motor and said operational position indicated by said current position signal, and for generating an instruction value by applying said deviation to a proportional plus integral plus differential operation; and, a second interface circuit for generating a drive command to a motor driver of said electric motor according to said instruction value generated by said operation unit;

wherein said operation unit includes initializing means for setting weighing constants of said proportional plus integral plus differential operation based on response characteristics of said electric motor which are calculated from deviations between the desired operational position of said rear wheels and said operational position indicated by said current position signal while said desired operational position of said electric motor is changed in steps by intermittently operatively connecting said electric motor and said rear wheels.

2. A controlling apparatus as claimed in claim 1, wherein said initializing means of said operation unit resets said weighing constants based on said deviation each time said desired operational position of said electric motor is changed in steps until said response characteristics of said electric motor falls within a target amount.

3. A controlling apparatus for controlling a steering angle of rear wheels of a four-wheel steering vehicle, comprising:

a vehicle speed sensor for detecting a speed of said vehicle;

a yaw rate sensor for detecting an angular velocity of rotation about a center of gravity of said vehicle;

a steering wheel angle sensor for detecting a steering angle of a steering wheel of said vehicle;

an electric motor for positioning said rear wheels based on a rear wheel angle instruction signal;

a position detector for detecting an operational position of said motor; and, a controller including a first interface circuit for generating a current position signal indicative of said operational position detected by said position detector, an operation unit for generating said rear wheel angle instruction signal based on inputs received from said vehicle speed sensor, said yaw rate sensor, said steering wheel sensor and said position detector, and a second interface circuit for applying said rear wheel angle instruction signal to a motor driver of said electric motor;

said operation unit of said controller including means for determining a desired operational position of said electric motor based on said inputs received from said vehicle speed sensor, said yaw rate sensor and said steering wheel sensor, means for determining a deviation between said desired operational position and said operational position indicated by said current position signal, and means for calculating a value of said rear wheel angle instruction signal by subtracting a first calculated value from a second calculated value, said first calculated value corresponding to a value obtained by applying said current position signal to a proportional operation, and said second calculated value corresponding to a value obtained by applying said deviation to a proportional operation and to an integral operation and summing the results of the proportion and integral operations, and then multiplying the thus summed results by a variable which is proportional to said speed of said vehicle.

4. A controlling apparatus as claimed in claim 3, wherein said operation unit of said controller includes means for selecting a value of said variable according to whether said rear wheels are turned in a same phase or an opposite phase relative to the front wheels of said vehicle.

* * * * *